7844X
W. A. TURNER
ODOMETER.
Patented Nov. 19, 1833.
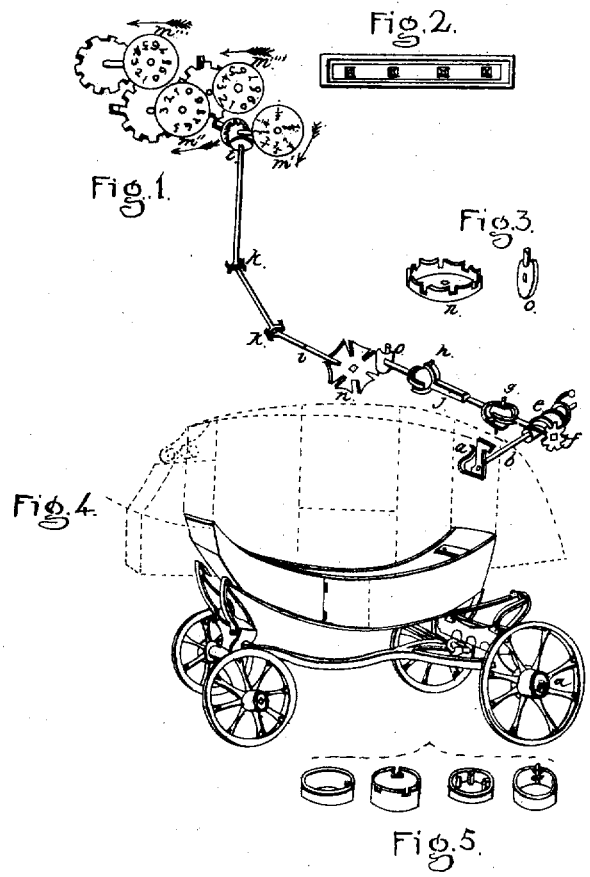
THE NORRIS PETERS CO., PHOTO-LITHO., WASHINGTON, D. C.

William A. Turner of Plymouth. North Carolina.

Letters Patent.

The schedule referred to in these Letters Patent and making part of the same containing a description in the words of the said William A. Turner, himself of his improvement in the odometer or machine for indicating the distance travelled in a carriage.

To all whom it may concern,

Be it known that I William A. Turner of Plymouth in the County of Washington & State of North Carolina, have invented an improvement in the Odometer, or machine for indicating the distance travelled by a wheeled carriage of any description, and I do hereby declare that the following is a full and exact description thereof.

As the mode of applying this instrument to any other carriage will be obvious from the explanation of the way which I have applied it to a stage or other four wheeled carriage, I shall in my description confine myself to a vehicle of this kind.

I drill a hole longitudinally thro the centre of the axle of one of the hind wheels, to admit a rod which may revolve within the said axle, extending from the outer end thereof, to the middle of the axle. As such axles are usually bent or curved under the body of the carriage, the hole for the rod will, in such case be free from the axle before it reaches the middle thereof, or if straight the axle may be constructed with an eye or opening in the middle, to allow the endless screw or pinion to act in the manner required. On the outer end of the rod within the cap of the hub, I attach a piece at right angles thereto, having on it a pointed, or hinged piece, so constructed that a pin projecting from the inside of the cap of the hub will touch against it, & carry it round in one direction, but in consequence of the hinge or joint giving way before the pin it will not turn it in the opposite direction; this is shown at a in the accompanying drawing, b being the rod within the axle; clicks or stop joints of this kind are well understood by workmen. The click when the

7844X carriage is backed, allows the rod with the machinery attached to remain
at rest; Entirely to prevent all danger of the wheelwork moving backward
from any stiffness in the click. I usually place a ratchet wheel upon some part
of the revolving rod, —
That end of the rod which is inwards & which reaches to the middle of the
axle has on it a bevil wheel or an endless screw e which mashes or takes
into a wheel f placed upon an axle or revolving rod, at right angles to the
former, extending out above the perch & inclining a little upwards towards the
body and front end of the carriage. This rod is made to run in proper boxes
or bearings. Soon after it leaves the axle & at any convenient distance there-
from, it is furnished with a universal joint g in order that it may
suffer any necessary deflection from a a straight line, without experiencing
a resistance which shall be injurious or obstruct its motion, & when it
reaches the bottom of the body of the carriage, or nearly so, I employ a
second universal joint h as the rod at, or near, that point is subject
to some change in its direction. — Between these two universal
joints, the rod by which the motion is conveyed from the gearing near
the axle to a revolving rod or axle i lying within the body of the
carriage is made double as at j in such a way that one part of it
may slide within the other, & admit of its being lengthened or shortened
by the pitching of the carriage and its motion from the elasticity of the spring
& braces upon which it is hung, whilst at the same time the revolution of
the rod itself is not impeded & the universal joints allow a free lateral
motion. — One of the most simple modes of forming this slide & which
answers perfectly well in practice, is to make one part of the rod a socket
with a square hole and the other portion square fitting into & sliding freely
in this hole, this rod I denominate the accommodation rod.
At the bottom of & within, or under the body of the carriage, the rod
which conveys the motion is boxed up in any convenient way by which
means it is defended from injury, it runs in proper bearings, & where
its direction is changed as at k. k. this may be done by universal
joints or by pinions. At its upper end l it has an endless
screw, a pinion, a fork and cross or other contrivance by which it may

7844X give motion to the wheelwork and index plates, which I usually place within the carriage near the upper end of the front directly at the back of the driver. – The same however may if preferred be fixed elsewhere.

When used on rail way carriages, the axles of which revolve with the wheels an endless screw or toothed wheel, is formed or placed upon the middle of the axle & from this the motion is conveyed to the wheelwork in the manner or upon the principle herein before specified.

The wheelwork may be constructed in various ways, the number of leaves upon the pinions, & of the teeth upon the wheels, being so calculated as to give the proper indication as dependant upon the circumference of the wheel from which the motion is derived. —

This every competent workman is able to calculate upon principles which do not require to be explained by me, –

I do not claim the application of wheels, pinions or endless screws, to produce this effect, they having been already applied for a similar purpose; but having devised a combination of well known mechanical contrivances which is new in its application & arrangement, I consider myself as entitled to this special application & arrangement, which I shall therefore proceed to describe. The plate upon which the distance travelled, is indicated, I make oblong as seen in fig 2, & usually with four openings, behind which the dials, or plates, having the figures on them revolve, The right hand opening may show, eighths or other fractional parts of miles, the next units, the next tens, & the next hundreds; these plates are seen at m, m, m, m, as they are made to revolve by a direct motion from their axes they turn in opposite directions, & the figures shown are therefore upon two of them, on the upper and upon the other two upon the lower side of the wheel, as will be seen by inspecting the drawing. –

As it is requisite, or most convenient, to give to the wheels an intermitting motion, I employ a kind of escapement wheel and pallet, well known in clock and watch work, n & o figs 1, & 3, show the construction of these wheels o being the pallet and n the wheel which it turns, the projecting part of the pallet taking into one of the notches, or teeth in the wheel at each revolution n, in fig 3 acts as a crown wheel, & in fig 4 as a common flat wheel. – The

78447X

The action throughout the index box is of this character.
I will now give an example of the number on the wheels which will answer for a coach wheel of five feet in diameter, the usual size of the hind wheels of coaches as used in this Country. I make the wheel or pinion f. of seven leaves; at or near the point where the rods enter the bottom of the carriage, I place a wheel & pallet n. o: the wheel having six notches or teeth, the wheel of the first index plate m has eight notches or teeth, & that of each of the others ten.
The pinion f. has seven leaves, & the thread of the endless screw a being single the coach wheel will turn seven times whilst the pinion turns once.
The wheel n has six teeth and it will therefore turn once whilst the coach wheel turns 7 × 6 or 42 times. Now upon taking the circumference of a 5 foot wheel with its tire, it will be found that 42 revolutions of such a wheel will carry it to a distance which is equal as near as may be to one eighth of a mile which is indicated by one revolution of the pallet o, [illegible] for each of the other wheels being [illegible] they are all made with the same number of teeth upon the wheels into which the pallets take, and with the exception of that on the arbor of the first plate, they are all flat wheels.
Fig. 4 shows the carriage and its body, with the accommodation rod and nearly all the parts of the apparatus which appear externally without the body of the carriage. As it is necessary to secure the part of the apparatus within the cap from injury by dust or otherwise and at the same to open the cap with facility for the purpose of greasing the axle, I have devised a new mode of fastening the cap on to the end of the hook, or barrel, of the hub, or nave, this I do by what is called a bayonet joint, having two or more, pins projecting from the rim of the cap, which pass into notches on the hoop. & then turn at right angles & lock; or otherwise I make a flanch, or rim, to project inwards from the edge of the hoop, & in this make two, or more notches, which allow slips upon the cap to pass thro, turn, and lock upon the flanch.—
In addition to their thus locking by pins, or slips, I place a spring bolt or catch, which falls into a cavity within the box & prevents its removal until the bolt latch or spring is raised; which may be done by a nail, or pin passing thro a small opening in the cap. Boxes of this [illegible]

983 7844X 379.

may be applied to all the wheels, the manner of making them may be seen in fig. 5, & will not require further explanation.

What I claim as my invention and for which I ask a Patent, is the carry-ing the motion, in the manner described from the centre of the axle towards the body of the carriage, the employment of the sliding rod for the purpose set forth, the giving the indication of the distance travelled within the body of the carriage, & the general manner in which the parts are arranged for effecting this object. I also claim the mode of securing the caps upon the hubs of the wheels, —

William A Turner

Witnesses
Thos. P. Jones
Jas. Andrews (Dr. in portfolio)

Ex.
Chf W

1914 [illegible]